United States Patent [19]

Daugherty et al.

[11] Patent Number: 5,131,619
[45] Date of Patent: Jul. 21, 1992

[54] VIBRATION ISOLATING MOUNT

[75] Inventors: Lenn Daugherty, Northborough; Brian Murphy, Shrewsbury; Michael Strzepa, Ashland, all of Mass.

[73] Assignee: Digital Equipment Corporation, Maynard, Mass.

[21] Appl. No.: 166,514

[22] Filed: Mar. 9, 1988

[51] Int. Cl.⁵ .............................. F16M 13/00
[52] U.S. Cl. .................. 248/635; 267/141.3; 267/141.7
[58] Field of Search ............... 248/603, 632, 634, 635, 248/636, 638; 267/141.2, 141.3, 141.4, 141.5, 141.6, 141.7

[56] References Cited

U.S. PATENT DOCUMENTS

| | | | |
|---|---|---|---|
| 913,024 | 2/1909 | Meacham | 411/526 |
| 2,210,097 | 8/1940 | Piron | 248/635 |
| 2,273,869 | 2/1942 | Julien | 267/141 |
| 2,312,379 | 3/1943 | Bechik | 411/526 |
| 2,755,056 | 7/1956 | Hutton | 267/141.7 |
| 3,028,665 | 4/1962 | Hurst | 267/141.4 |
| 3,893,221 | 7/1975 | Lehmann | 411/526 |
| 4,014,588 | 3/1977 | Kohriyama | 267/141.4 |
| 4,651,839 | 3/1987 | Isobe | 248/635 |
| 4,683,709 | 8/1987 | Vasko | 54/66 |

FOREIGN PATENT DOCUMENTS

| | | | |
|---|---|---|---|
| 533270 | 5/1955 | Belgium | 267/141.7 |
| 2921866 | 4/1980 | Fed. Rep. of Germany . | |
| 1201597 | 7/1959 | France | 267/141.3 |
| 260025 | 2/1949 | Switzerland | 267/141.7 |
| 667232 | 2/1952 | United Kingdom | 267/141.3 |

Primary Examiner—Carl D. Friedman
Attorney, Agent, or Firm—Fish & Richardson

[57] ABSTRACT

A casting of visco-elastic material is encased between rigid, flanged outer and inner sleeves to enhance its mechanical properties.

29 Claims, 2 Drawing Sheets

VIBRATION ISOLATING MOUNT

BACKGROUND OF THE INVENTION

Resilient, shock absorbing mounts, such as elastomeric grommets, are frequently used to limit transmission of externally generated vibrational energy into a mechanically sensitive component. A disk drive, mounted in a host computer cabinet, for example, is extremely vulnerable to externally induced vibrations because the drive depends on precise head positioning by a compliant slider arm and rotary or linear actuator assembly. Vibrations transmitted from the cabinet through the chassis can result in read/write errors if the disk drive mechanism is not adequately isolated within the chassis. The higher the storage density, of course, the less the tolerance for vibration.

Vibrations can be isolated by using special mounts in sets of three or more between the disk drive chassis and drive mechanism. The mounts absorb a large percentage of the vibrational energy induced in the cabinet by the environment and thus avoid transmitting it to the disk drive mechanism. Low cost vibration isolating mounts for this type of application must not only be capable of absorbing vibrational energy, but must function properly over the entire operating temperature range, typically from about 40° F. to over about 120° F. In the past, conventional, low cost elastomeric grommets have served poorly in this environment.

SUMMARY OF THE INVENTION

As a general feature, the invention provides a vibration isolator between two components, comprising a visco-elastic body encased in a rigid sleeve with a rigid inner mounting member, spaced from the sleeve, embedded in the visco-elastic body. One component is connected to the outer sleeve, the other to the inner member. The inner member is preferably a coaxial inner sleeve-like liner. By encasing the visco-elastic material in rigid sleeves or ferrules connected to different components, the vibrational loads are distributed over larger surface areas thus overcoming the extreme mechanical weakness of visco-elastic material, such as Sorbothane TM, preferred because of its outstanding damping and temperature stability.

In the preferred embodiment, the outer sleeve and rigid inner mounting member are coaxial, commercially available metal eyelets each having a cylindrical shank and a head at one end formed by an annular flange. The other ends are adjacent and preferably substantially coplanar. The inner eyelet is longer than the outer eyelet so that its head stands above the outer eyelet's head. The elastomer is cast in the space between the inner and outer eyelets and becomes bonded to the whole inside of the outer eyelet, the whole outside of the shank of the inner eyelet and the whole underside of the inner eyelet flange, thus forming a raised tapered flat boss under the head of the inner eyelet. A tanged ring is received over the outer eyelet shank to secure the outer eyelet to one component, for example, a chassis. A screw through the inner eyelet fastens it to the other component, such as a disk drive mechanism.

The design allows the mount to take full advantage of the excellent and temperature stability of Sorbothane TM and similar visco-elastic materials despite their otherwise unacceptable mechanical properties. The cost effectiveness of the mount design is enhanced by the fact that the mounts can be made in simple batch molds using off the shelf eyelets with no machining.

BRIEF DESCRIPTION OF THE DRAWINGS

The drawings are briefly described as follows.

DESCRIPTION OF THE PREFERRED EMBODIMENTS

The embodiment of the vibration isolating mount described herein for illustration is designed specifically for mounting a high performance magnetic disk drive mechanism to a chassis preferably hard mounted in a host computer cabinet to provide mechanical isolation of the sensitive disk drive mechanism from vibrations induced via the cabinet.

The preferred Sorbothane TM elastomer exhibits outstanding energy absorption capability. It retains this damping capability and also its elastic properties (spring rate) over a wide temperature range. The material derives its characteristics in part from its consistency. Although a solid material, it has almost fluid-like properties. One drawback of this attribute is that the strength of the material is low; it tears easily, thus making it a truly unacceptable material for a conventional grommet. Indeed, Sorbothane TM represents a nonstructural material being used in this instance in an application having structural, i.e., load bearing requirements which would load the material in shear, one of its most discouraging attributes.

The mechanical weakness of Sorbothane TM is overcome by encapsulating it from the outside and the inside with reinforcing material, preferably metal eyelets, which act as an outer ferrule and an inner lining or "inner ferrule". This encapsulation prevents tearing and creep or settling. The inner and outer ferrules carry the loads imposed by the chassis and the mechanics assembly and distribute these loads over their large contact surface area with the Sorbothane TM casting. The result is low interface stresses, well within the exceptionally low mechanical limits of the elastomer.

Figure 1:
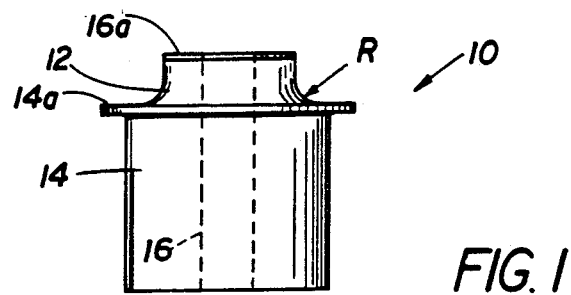
FIG. 1 is a side view of a vibration isolating mount according to the invention.
Figure 2:
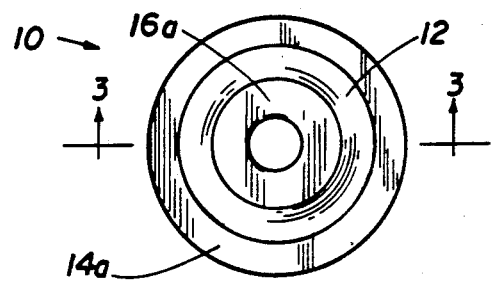
FIG. 2 is a plan view of the mount of FIG. 1.
Figure 3:
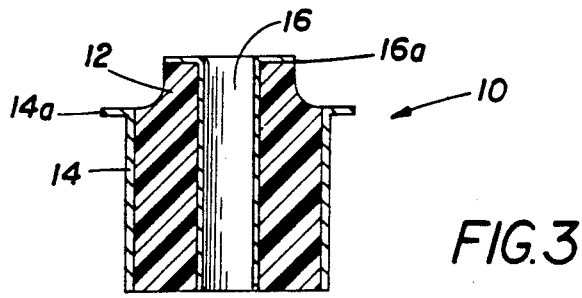
FIG. 3 is a sectional view of the mount taken along lines 3—3 of FIG. 2.

As shown in FIGS. 1, 2 and 3, the mount 10 comprises a flanged cylindrical structure having a cylindrical body or plug 12 of soft, compliant visco-elastic material of low mechanical strength, preferably Sorbothane TM, encased within an outer rigid metal eyelet 14 in the form of a flanged sleeve forming a ferrule, with a longer, inner rigid metal eyelet 16 of smaller diameter forming a hollow, spine like, reinforcing inner ferrule or space coaxially embedded in the visco-elastic body 12. The inner and outer eyelets 14 and 16 have axially spaced parallel annular flanges 14a and 16a, respectively, as shown. Suitable eyelets 14 and 16 are commercially available in brass, but are designed for entirely different applications. In fact, in ordinary use, after inserting the cylindrical shank in a hole, the unflanged end is struck with a tool to make a complementary flange securing the eyelet like a rivet. In contrast, the present application leaves the unflanged ends intact. In one embodiment, the outer eyelet 14 has a shank portion with an outer diameter (O.D.) of 0.500 inch (in.), a flange 14a with an O.D. of 0.625 in., and an overall length of 0.445 in., while the inner eyelet 16 has a shank with an O.D. of 0.149 in., a flange 16a with an O.D. of 0.315 in. and an overall length of 0.568 in. The radius of curvature R (FIG. 1) of the raised, tapered neck portion of the plug 12 is 0.062 in. in the embodiment with eyelets of the aforementioned dimensions. With the preferred Sorbothane TM elastomer, the specification of brass for the ferrules does not appear to be critical and aluminum or steel may be substituted if desired, the bonding characteristics and availability being the chief criteria.

Figure 4:
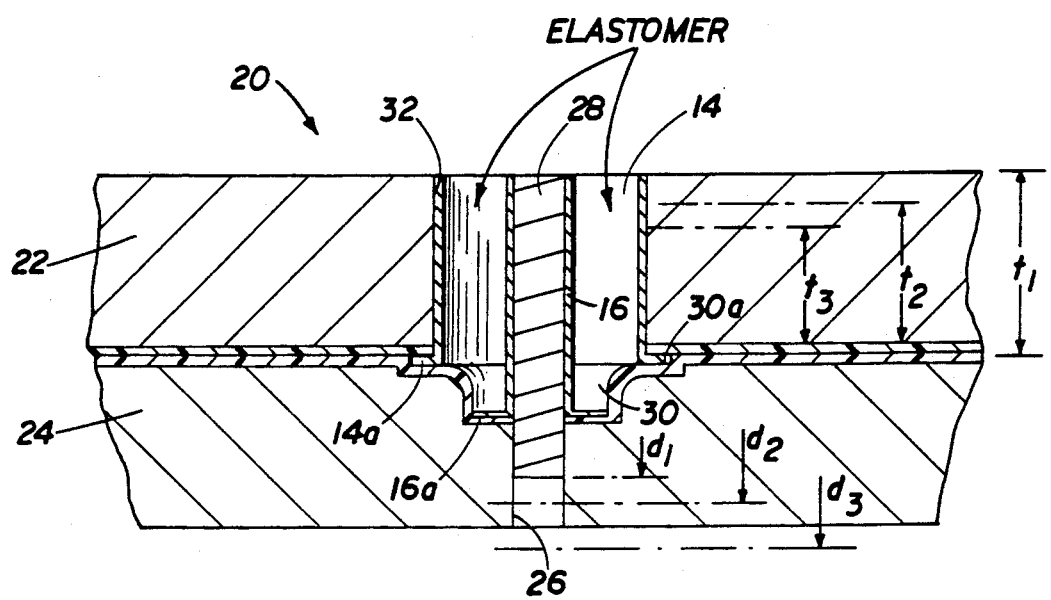
FIG. 4 is a sectional schematic view of a portion of a two-part mold assembly illustrating one mold for making the article of FIG. 1, with the inner and outer eyelets in place, ready for the introduction of the liquid elastomer.

As shown in FIG. 4, the mount 10 of FIG. 1 is made in an inverted mold 20 comprising a multi-apertured cover plate 22 and bottom mold 24, both preferably lined with Teflon®, as shown in FIG. 4. For each mount mold, the bottom mold 24 has a vertical bore 26 into which a steel dowel pin 28 is press fit. The bottom mold 24 also has a deep, coaxially flared counter bore 30 for the tapered neck with an additional shallow counter bore 30a forming a depressed annular rim for flange 14a. The inner eyelet 16, with its flat flanged end down, is slipped over the dowel 28. The diameter of the bottom of the flared counter bore 30 is slightly larger than the O.D. of the flange 16a. Before assembling the cover plate 22 to the bottom mold 24, the outer eyelet 14 is inserted upside down in the annular counter bore 30a, its diameter being slightly larger than the O.D. of the flange 14a. For each mount, cover plate 22 has a straight cylindrical through-hole 32 in which the shank of the eyelet 14 is received. The clearance between the O.D. of the outer eyelet 14 and the diameter of the through hole 32 is close, but adequate to allow easy removal of the cover plate after formation of the mount 10. The assembled mold 20 clamps the outer eyelet 14 in place. The inner side walls of the eyelet 14 and counter bore 30 form a cavity into which the elastomer is poured in its liquid, uncured state. However, before introducing the elastomer, the exposed surfaces of the eyelets are coated with a primer, preferably Lord 210A, to enhance bonding between the Sorbothane TM elastomer and the metal eyelets. In practice, the inner eyelets can be bathed in the primer, but the outer eyelets should have only the inner cylindrical surface painted with the primer. Preferably, there are plural cavities per mold 20. A large quantity of liquid Sorbothane TM can be flowed over the horizontal mold, troweled into the eyeletted cavities and allowed to "solidify" and cure. The Sorbothane TM thus forms an in situ casting between the coaxial eyelets. After the Sorbothane TM has cured, the plate and bottom mold are separated and the finished mounts are removed.

As shown in FIG. 4, different thicknesses of cover plate 22 can be employed with the sam bottom mold 24 to make mounts having different axial dimensions. Cover plates with thicknesses $t_1$, $t_2$ and $t_3$ can be accommodated by pressing dowel pin 28 into bore 26 to the corresponding depths $d_1$, $d_2$ and $d_3$ as shown, so that the top of the dowel pin is flush with the top of the cover plate to facilitate troweling to fill each cavity flush with Sorbothane TM.

The unusual visco-elastic material preferred for this application is marketed in the United States by Sorbothane, Inc. of Kent, Ohio under license from the British firm BTR Industries. Sorbothane TM is a proprietary polyol isocyanate based elastomer believed to contain about a 1:10 (by weight) mixture of isocyanate and polyol, giving it quasi-fluid qualities. Its density is about 80 lbs./cubic foot.

The bizarre characteristics of Sorbothane TM are manifested by its quantitative physical properties. Its "hardness" is measured on the softest durometer scale available "Shore 00". Tear strengths for Shore 00 durometers 50 and 70 are given as 22.8 lb./in. ("p.p.i.") and 26 p.p.i., respectively, according to test ASTM D-624, 1 mm nick. Tensile strength of the same durometers 50 and 70 are 120 p.s.i. and 180 p.s.i., respectively, according to test ASTM D-412. In contrast, silicone has a tensile strength of 1500 p.s.i. while other elastomers like Neoprene TM, natural rubber and polyurethane exhibit tensile strengths of 4000, 4500 and 5000 p.s.i., respectively.

Known highly damped materials used previously in isolation mounts include "C-1002", a PVC alloy, from E.A.R. Division, Cabot Corp., Indianapolis, Ind. and "MPC092" from Industrial Products Division, Lord Corp., Erie, Pa. C-1002 exhibits tensile strength of 1550 p.s.i. (ASTM D-638-77A) and tear strength of 25.7 lbs. per 125 inch (ASTM D-1004-641), while MPC092 exhibits tensile strength of 1920 p.s.i. (ASTM D-412) and tear strength of 185 p.p.i. (ASTM D-624, Die C), according to manufacturer's data sheets. While both materials possess good damping qualities, they are very temperature sensitive. The much lower hardness, tensile and tear strengths of Sorbothane TM undermine its structural integrity. However, it has been found that Sorbothane's relevant mechanical properties, such as they are, remain substantially unaffected by temperature over the operating range of interest.

Sorbothane TM is available in a variety of Shore 00 durometers. Durometer Nos. in a range of from about 50 to about 60 (Shore 00) appear to be advantageous, durometer No. 55 being presently preferred for this application. Durometer Nos. may be selected to accommodate different size disk drives, for example. However, durometer 30 (Shore 00) has been found to tend to creep at operating temperatures under load.

Figure 5:
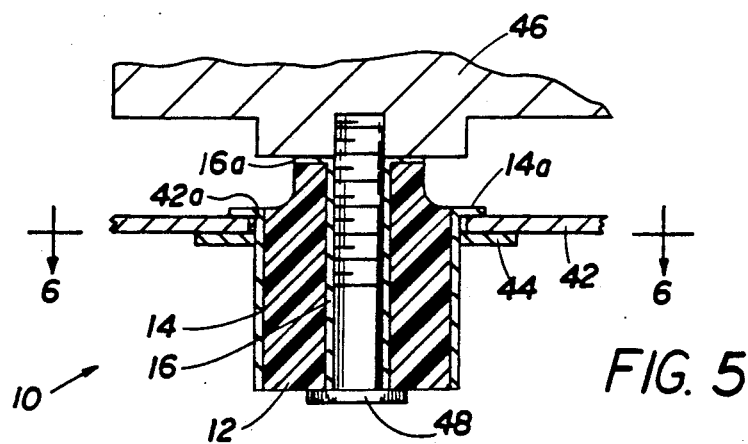
FIG. 5 a sectional view of the mount of FIG. 1 mounting a component to a frame element.
Figure 6:
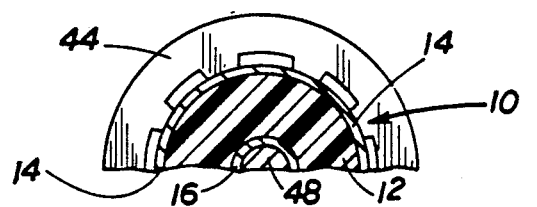
FIG. 6 is a partial sectional view of the mount taken along lines 6—6 of FIG. 5.

As shown in FIGS. 5 and 6, sets of mounts 10 are used to mount a disk drive mechanism 46 or other mechanically sensitive device to a chassis 42. Each mount 10 is inserted into a hole 42a in the chassis 42 slightly larger than the O.D. of the shank 14 so that it hangs by the flange 14a which comes to rest on and is supported by the upper surface of the chassis wall 42 on the periphery of the hole 42a. The mount 10 is secured by means of a tanged spring clip ring 44 (FIG. 6) which is slipped over the shank of the outer eyelet 14 (interference fit) into engagement with the underside of the chassis wall 42 so as to clamp the wall 42 between the tanged ring 44 and the flange 14a as shown in FIG. 5. The mount 10 is thus secured to the chassis 42. The mounted component 46 is attached to the inner eyelet 16 by means of a machine screw 48 passed through the inner eyelet as shown, or other fastening means. The weight of the component 46 is thus carried by the inner eyelet 16 suspended in the elastomer within the mount 10. Three or more mounts 10 are used to create a compliant platform for the disk drive mechanism.

A disk drive mechanism was mounted with isolators constructed according to the invention using the aforementioned eyelet dimensions, Sorbothane ™ Durometer 55 (Shore 00) made by the molding technique described herein. The isolators exhibited vibration transmissibilities of less than 3.5 and a natural frequency variation in the assembled drive of only 40 Hz over the full operating temperature range (41° F. to 122° F.).

The described molding technique in combination with the commercial availability of suitable eyelets allow for relatively low cost manufacture while achieving a higher degree of isolation than conventional isolators.

Other materials and design variations can be selected without departing from the principle of the invention. For example, the inner ferrule 16 need not be hollow if desired. The material of the load carrying inner and outer components of the mount may be made of another rigid material such as plastic or epoxy fiberglass. While Sorbothane ™ durometer 50 to 60 is highly advantageous (55 is preferred), other similar visco-elastic materials, if any, and, possibly, other soft elastomers such as Neoprene ™ may be useful in this design as alternative materials although incapable of meeting the same high performance specifications as Sorbothane ™. Neoprene ™, for example, would make a mount of the same design and dimensions much stiffer in the axial direction. The profile of the raised neck portion of the elastomeric body 12 is also significant in molding the mount. The radiused concave profile shown in FIG. 1 is presently preferred although other configurations may be equally useful in the same or different applications. It does appear to be advantageous for molding to have the elastomer terminate flush with the edge of the inner eyelet flange 16a and flush with the outer flat surface of the outer eyelet flange 14a. While the preferred embodiment is designed for disk drives, the invention may find useful application in many other situations requiring low cost vibration isolation. These and other embodiments are within the claimed invention.

We claim:

1. A vibration isolator for mounting one component to another, comprising
   a body made of a visco-elastic material having a Shore 00 durometer number in a range of from about 30 to about 70,
   a rigid outer sleeve encasing said body adapted to be connected to one component, and,
   a rigid inner member, spaced from said outer sleeve, embedded within said body, adapted to be connected to the other component.

2. The isolator of claim 1, wherein said outer sleeve and said inner member have substantially parallel major axes.

3. The isolator of claim 2, wherein said inner member is hollow and extends through said visco-elastic body.

4. The isolator of claim 1, wherein said visco-elastic material is a polyol-isocyanate-based elastomer.

5. The isolator of claim 1, wherein said outer sleeve has a radial flange extending outwardly from one end.

6. The isolator of claim 5, wherein said inner member has a radial flange extending outwardly from one end axially spaced from the radial flange on said outer sleeve.

7. The isolator of claim 6, wherein said visco-elastic body has a raised, tapered central neck portion defined between said radial flanges.

8. The isolator of claim 7, wherein the side profile of the surface of the neck portion of the visco-elastic body is substantially concave.

9. The isolator of claim 1, wherein said inner member is tubular.

10. The isolator of claim 1, wherein said inner member is longer than said outer sleeve.

11. The isolator of claim 10, wherein said outer sleeve and said inner member are coaxial eyelets in the form of cylinders flanged on only one end.

12. The isolator of claim 11, wherein said eyelets have a pair of adjacent ends which are approximately coplanar, the visco-elastic body being flush with said ends.

13. A vibration isolator for mounting one component to another, comprising
   a visco-elastic body, said visco-elastic material being a polyol-isocyanate-based elastomer containing about one part by weight isocyanate to about ten parts by weight polyol,
   a rigid outer sleeve encasing said body adapted to be connected to one component, and
   a rigid inner member, spaced from said outer sleeve, embedded within said body, adapted to be connected to the other component.

14. A vibration isolator for mounting one component to another, comprising
   a body made of a visco-elastic material having a tensile strength about equal to or less than 200 p.s.i. according to test ASTM D-412,
   a rigid outer sleeve encasing said body adapted to be connected to one component, and
   a rigid inner member, spaced from said outer sleeve, embedded within said body, adapted to be connected to the other component.

15. A vibration isolator for mounting one component to another, comprising
   a visco-elastic body,
   a rigid outer cylindrical sleeve encasing said body adapted to be connected to one component, and
   a rigid inner member, spaced from said outer sleeve, embedded within said body, adapted to be connected to the other component
   wherein said outer sleeve has a radial flange extending outwardly from one end and said inner member has a radial annular flange extending outwardly from one end axially spaced from the radial flange on said outer sleeve and having an outer diameter substantially less than the inner diameter of said outer sleeve, said visco-elastic body having a raised, tapered central neck portion defined between said radial flanges, said neck portion being flush with the edge of the inner member flange and flush with the radial surface of the outer sleeve flange.

16. A vibration isolator for mounting one component to another, comprising
   a visco-elastic body,
   a rigid outer sleeve encasing said body adapted to be connected to one component, and
   a rigid inner member, spaced from said outer sleeve, embedded within said body, adapted to be connected to the other component, said inner member being longer than said outer sleeve, said outer sleeve and said inner member being coaxial eyelets in the form of cylinders flanges on only one end, the outer diameter of the inner eyelet flange being less than the inner diameter of the outer eyelet, said eyelets having a pair of adjacent nonflanged ends which are approximately coplanar, the visco-elastic body being flush with said ends, the visco-elastic body being flush with the edge of the inner eyelet flange and flush with the outer flat surface of the outer eyelet flange.

17. A vibration isolator, comprising coaxial through-hole, one end of said body forming a flat bottom at right angles to its axis and the other end having an annular shoulder portion and a raised, tapered central coaxial neck portion surrounding said hole, said neck portion having a flat top approximately parallel to said flat bottom, an outer eyelet forming an outer ferrule bonded to and encasing said body and having a radially outwardly projecting flange with an upper surface approximately flush with the annular shoulder of said body, and an inner eyelet forming an inner ferrule extending the length of said through-hole, bonded to and lining the inside wall of said through-hole, said inner eyelet having a radial flange overlying and bonded to said flat top, said neck being flush with the edge of the inner eyelet flange, the diameter of the inner eyelet flange being less than the inner diameter of said outer eyelet.

18. The isolator of claim 17, wherein the side profile of the surface of the neck portion of said body is substantially concave.

19. The isolator of claim 17, wherein said visco-elastic material has a Shore 00 durometer number in a range of from about 30 to about 70.

20. The isolator of claim 17, wherein said visco-elastic material is a polyol-isocycanate based elastomer.

21. The isolator of claim 20, wherein said elastomer contains about one part by weight isocyanate to about ten parts by weight polyol.

22. A vibration isolator, comprising a rigid outer sleeve forming an outer rigid mounting member, a rigid inner mounting member located within said outer sleeve, and a visco-elastic material cast in the space defined between said outer sleeve and said inner mounting member, said visco-elastic material having a Shore 00 durometer number in a range of from about 30 to about 70.

23. The isolator of claim 22, wherein said inner mounting member includes an inner sleeve.

24. The isolator of claim 23, wherein said inner sleeve is longer than the outer sleeve.

25. The isolator of claim 24, wherein said inner and outer sleeves have a pair of adjacent ends which are approximately coplanar.

26. The isolator of claim 25, wherein the visco-elastic material is approximately flush with said adjacent ends of said sleeves.

27. The isolator of claim 26, wherein the inner mounting member further includes a mounting flange extending radially outward from the other end of said inner sleeve.

28. The isolator of claim 23, further comprising an elongated fastener extending through said inner sleeve.

29. The isolator of claim 28, wherein said fastener is a screw.

* * * * *

UNITED STATES PATENT AND TRADEMARK OFFICE
CERTIFICATE OF CORRECTION

PATENT NO. : 5,131,619

DATED : July 21, 1992

INVENTOR(S) : Lenn Daugherty et al.

It is certified that error appears in the above-identified patent and that said Letters Patent is hereby corrected as shown below:

Column 1, line 65, insert --damping-- after "excellent".
Column 3, line 61, "sam" should read --same--.
Column 4, line 28, "125 inch" should read --.125 inch--.

Column 7, line 6, claim 17, after "comprising" insert --a cylindrical body of visco-elastic material having a--.
Column 7, line 8, claim 17, "angels" should read --angles--.

Signed and Sealed this

Twenty-eighth Day of September, 1993

Attest:

BRUCE LEHMAN

Attesting Officer    Commissioner of Patents and Trademarks